United States Patent
Sato

(10) Patent No.: US 8,614,822 B2
(45) Date of Patent: Dec. 24, 2013

(54) PRINT DATA PROCESSING APPARATUS, PRINT DATA PROCESSING METHOD, AND STORAGE MEDIUM

(75) Inventor: Yuushi Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 474 days.

(21) Appl. No.: 12/968,027

(22) Filed: Dec. 14, 2010

(65) Prior Publication Data

US 2011/0149347 A1 Jun. 23, 2011

(30) Foreign Application Priority Data

Dec. 18, 2009 (JP) .................................. 2009-288464

(51) Int. Cl.
*G06F 15/00* (2006.01)

(52) U.S. Cl.
USPC ........ 358/1.16; 358/1.17; 358/1.15; 358/538; 345/505

(58) Field of Classification Search
None
See application file for complete search history.

(56) References Cited

U.S. PATENT DOCUMENTS

| | | | | |
|---|---|---|---|---|
| 5,010,515 A * | 4/1991 | Torborg, Jr. | ................. | 345/505 |
| 5,129,049 A * | 7/1992 | Cuzzo et al. | ................. | 358/1.14 |
| 5,793,937 A * | 8/1998 | Chura et al. | ................. | 358/1.16 |
| 5,850,504 A * | 12/1998 | Cooper et al. | ................. | 358/1.18 |
| 6,130,759 A * | 10/2000 | Blair | ................. | 358/1.17 |
| 6,918,706 B2 * | 7/2005 | Isshiki | ................. | 400/76 |
| 7,075,541 B2 * | 7/2006 | Diard | ................. | 345/505 |
| 7,286,819 B2 * | 10/2007 | Isshiki | ................. | 455/414.4 |
| 7,715,031 B2 * | 5/2010 | Westervelt et al. | ................. | 358/1.15 |
| 8,139,082 B2 * | 3/2012 | Kitora | ................. | 345/619 |
| 2003/0056076 A1 * | 3/2003 | Cook et al. | ................. | 711/173 |
| 2004/0120007 A1 * | 6/2004 | Jacobsen et al. | ................. | 358/1.16 |
| 2007/0070403 A1 * | 3/2007 | Toda et al. | ................. | 358/1.15 |
| 2007/0188486 A1 * | 8/2007 | Honmi | ................. | 345/419 |
| 2007/0236733 A1 * | 10/2007 | Guarnieri et al. | ................. | 358/1.16 |
| 2008/0137135 A1 * | 6/2008 | Takeishi | ................. | 358/1.15 |
| 2009/0249017 A1 * | 10/2009 | Prebble | ................. | 711/170 |
| 2009/0251734 A1 * | 10/2009 | Tanaka | ................. | 358/1.17 |
| 2010/0060934 A1 * | 3/2010 | Bellert | ................. | 358/1.17 |

FOREIGN PATENT DOCUMENTS

JP 2008-143067 A 6/2008

OTHER PUBLICATIONS

David Kappos, Subject Matter Eligibility of Computer Readable Media, US Patent and Trademark Office, Feb. 23, 2010, 1351 OG 212.*

* cited by examiner

*Primary Examiner* — King Poon
*Assistant Examiner* — Ted Barnes
(74) *Attorney, Agent, or Firm* — Carter, DeLuca, Farrell & Schmidt LLP

(57) ABSTRACT

A print data processing apparatus allocates memory from an unused area of memory to one processor out of two processors so that a size of the memory allocated to the processor is equal to a fallback threshold value, and then allocates an unused area of the remaining memory to the other processor.

7 Claims, 15 Drawing Sheets

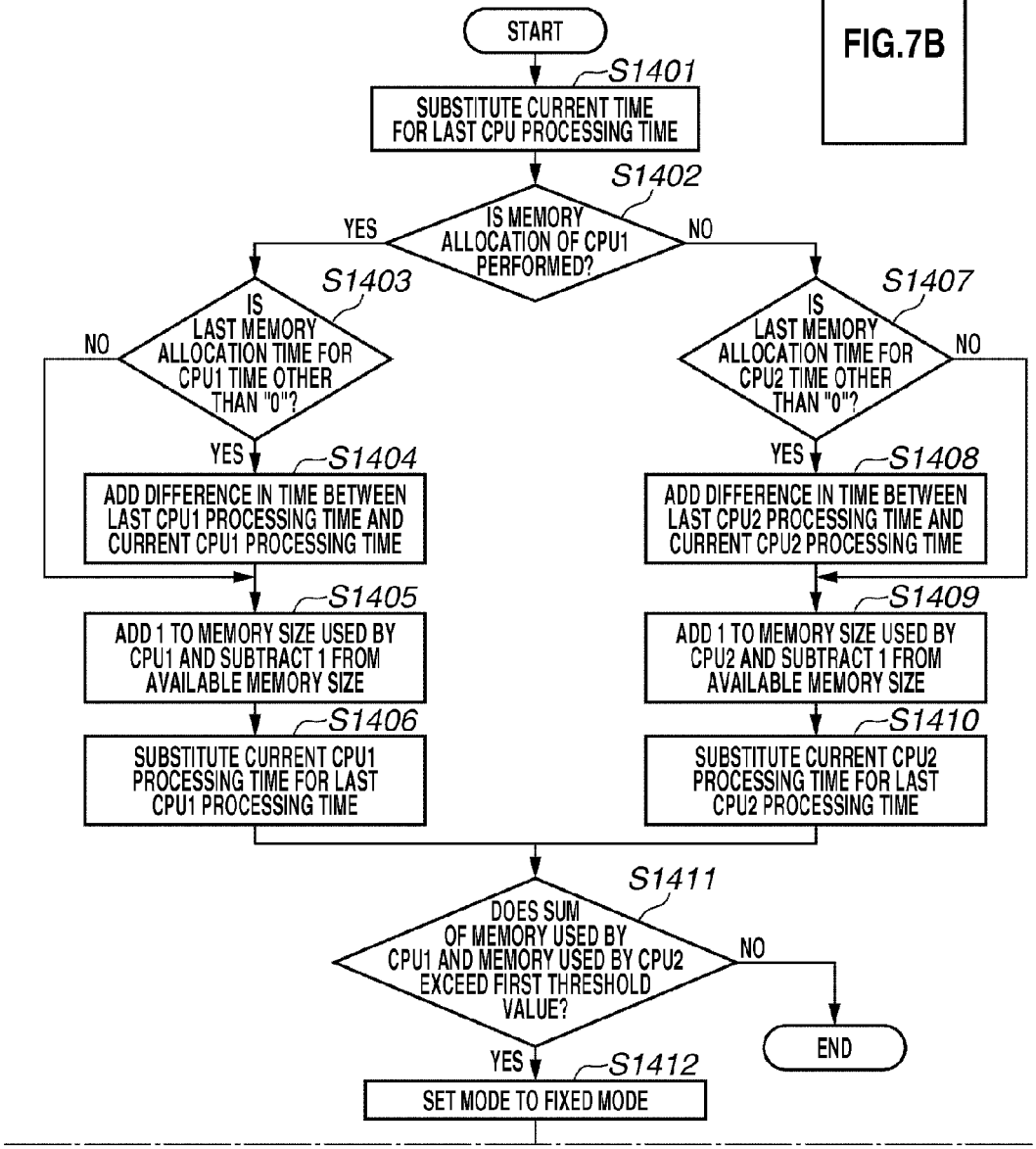

FIG.11
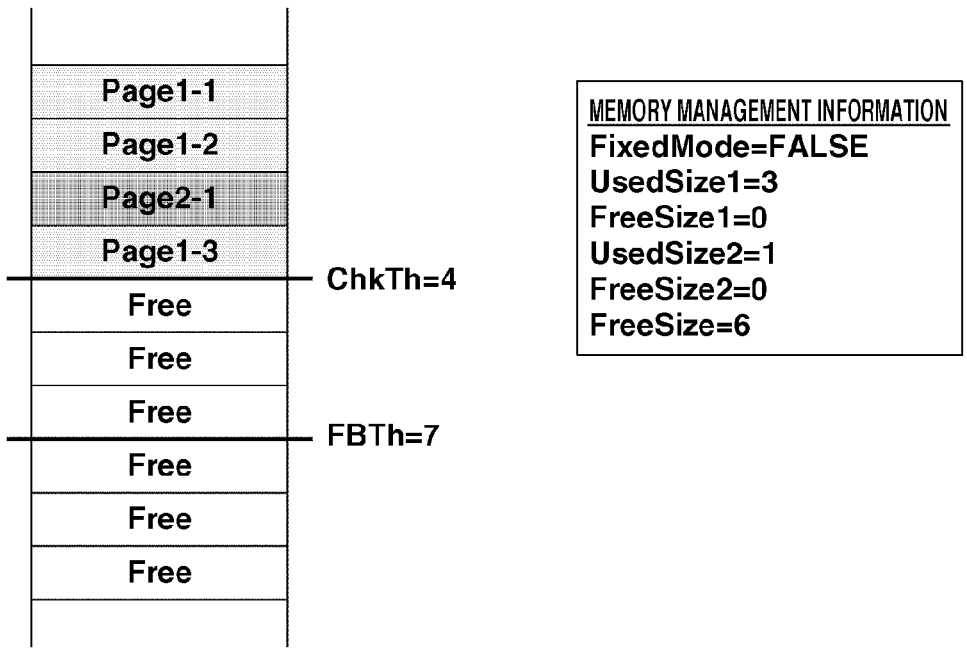
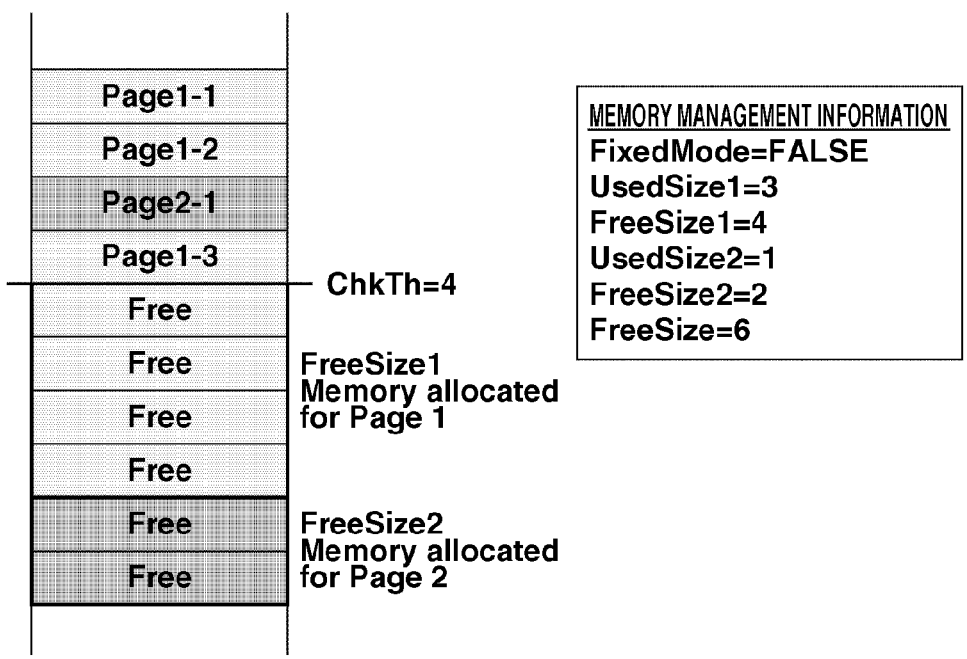

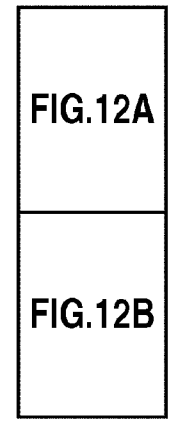
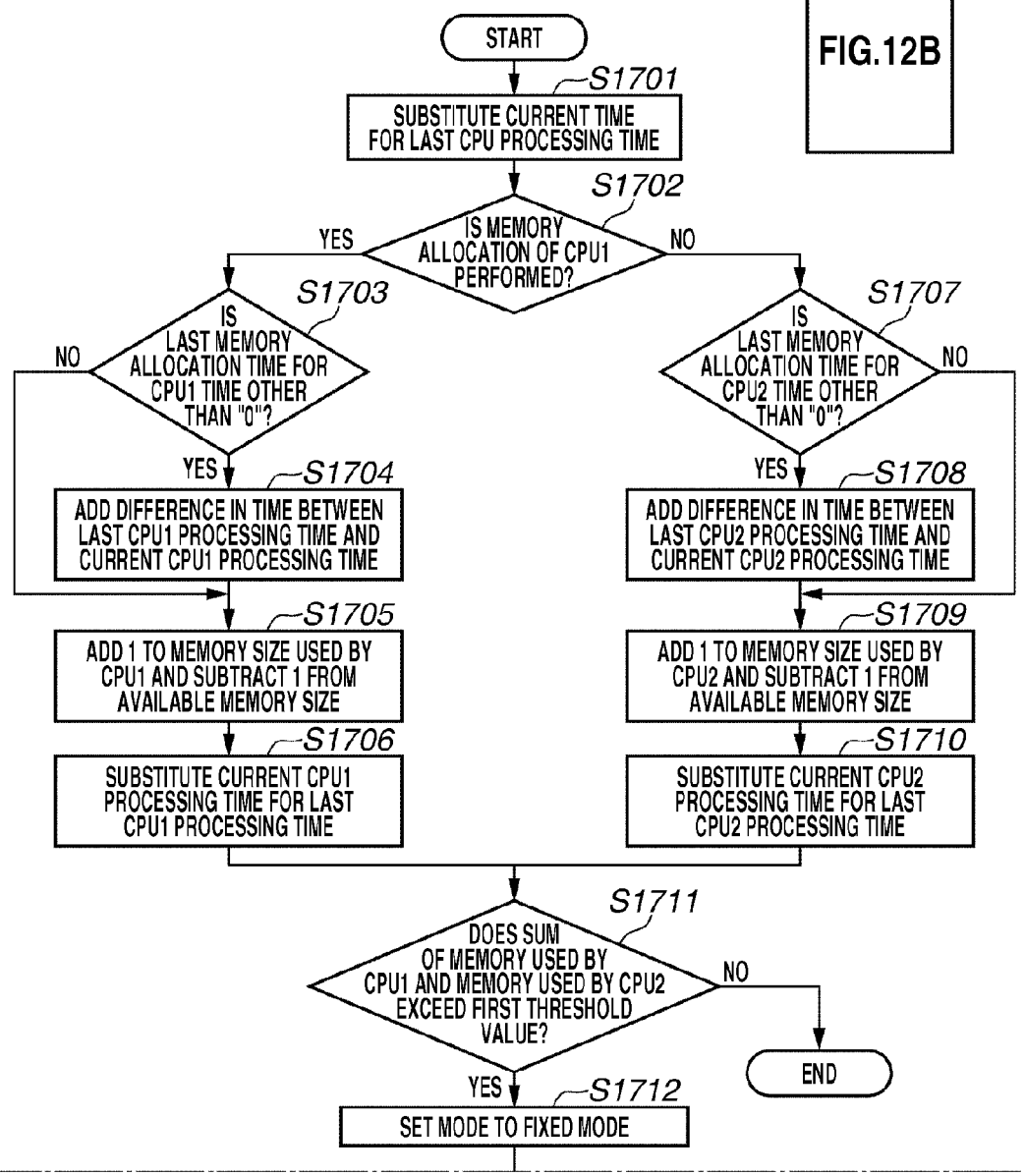
FIG.12
FIG.12A

PRINT DATA PROCESSING APPARATUS, PRINT DATA PROCESSING METHOD, AND STORAGE MEDIUM

BACKGROUND OF THE INVENTION

1. Field of the Invention

The present invention relates to a print data processing apparatus, a print data processing method, and a storage medium.

2. Description of the Related Art

Page description language (PDL) processing performed by an image forming apparatus includes PDL command analysis processing, intermediate data (display list (DL)) generation, and rendering processing. If memory used for DL storage is not enough, data is temporarily rendered. Then, the image is compressed by fallback processing. According to this fallback processing, a free memory space for the DL storage will be available and processing of a large amount of data can be continued. In recent years, multicore central processing units (CPUs) have been developed according to technical advances in hardware. The multicore CPU is used in personal computers (PCs) and contributes to realizing parallel execution of a plurality of applications.

The multicore CPU is also used in multi function peripherals (MFPs) and used for stress-free parallel execution of a plurality of functions such as copying and printing. The multicore CPU can also be used for page-parallel processing of PDL.

Japanese Patent Application Laid-Open No. 2008-143067 discusses a method for allocating memory required for a plurality of PDL command analysis operations which are parallelly processed. This method is used when page parallel processing of PDL command operations of PDL data is performed by a plurality of CPUs. If insufficient memory occurs with any of the PDL command analysis operations when a plurality of PDL command analysis operations are being parallelly processed, the affected PDL command analysis operation will be cancelled. Then, according to the circumstances of the cancellation, the memory allocated to the cancelled operation is deallocated. After then, the deallocated memory is allocated to a PDL analysis unit which is not cancelled. Thus, the processing is continuously performed by the PDL analysis unit.

However, if memory is not sufficient during the parallel processing of a plurality of PDL command analysis operations, since some of the PDL command analysis operations are cancelled during the parallel processing, it is difficult to make full use of the performance of the plurality of processors.

SUMMARY OF THE INVENTION

According to an aspect of the present invention, a print data processing apparatus includes a reception unit configured to receive print data, a first processor configured to generate intermediate data based on the print data received by the reception unit and store the generated intermediate data in a memory area, a second processor, different from the first processor, configured to generate intermediate data based on the print data received by the reception unit and store the generated intermediate data in a memory area, and a memory management unit configured to allocate memory of a predetermined size in an unused area of a memory to the first processor or the second processor from which a memory acquisition request has been given, wherein, if a size of memory allocated to both the first processor and the second processor by the memory management unit exceeds a predetermined value, the memory management unit allocates memory from an unused area of the memory to one of the first and the second processors so that a size of the memory allocated to the one of the first and the second processors corresponds to a fallback threshold value, and memory of the remaining unused area is allocated to the other of the first and the second processors.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates an example of a relation between memory management and threshold value when the memory is used according to the first exemplary embodiment.

DESCRIPTION OF THE EMBODIMENTS

Various exemplary embodiments, features, and aspects of the invention will be described in detail below with reference to the drawings.

First, definition of the terms used in the exemplary embodiments of the present invention will be described.

Intermediate data is used by a rendering unit when it renders print data. The intermediate data is generated based on the print data.

Fallback is processing performed when a size of a DL (i.e., intermediate data) exceeds a certain data size or a work area used for processing the DL is determined to exceed a certain data size. The DL which has been generated up to that time is rendered and a raster image is generated. When the raster image is generated, the generated DL is cleared. After then, the raster image is added to a part of the DL as a background image of a drawing area.

When intermediate data for one page is generated, the compressed background image is decompressed and rendered. The DL of the rest of the page is rendered and an image for one page is formed based on two pieces of image data.

Since the background image is normally compressed, the size of the added DL is smaller than the size of the original DL. Thus, although the memory space is limited, processing of a DL of a larger size can be realized by generating the rest of the DL using the free space.

Figure 1:
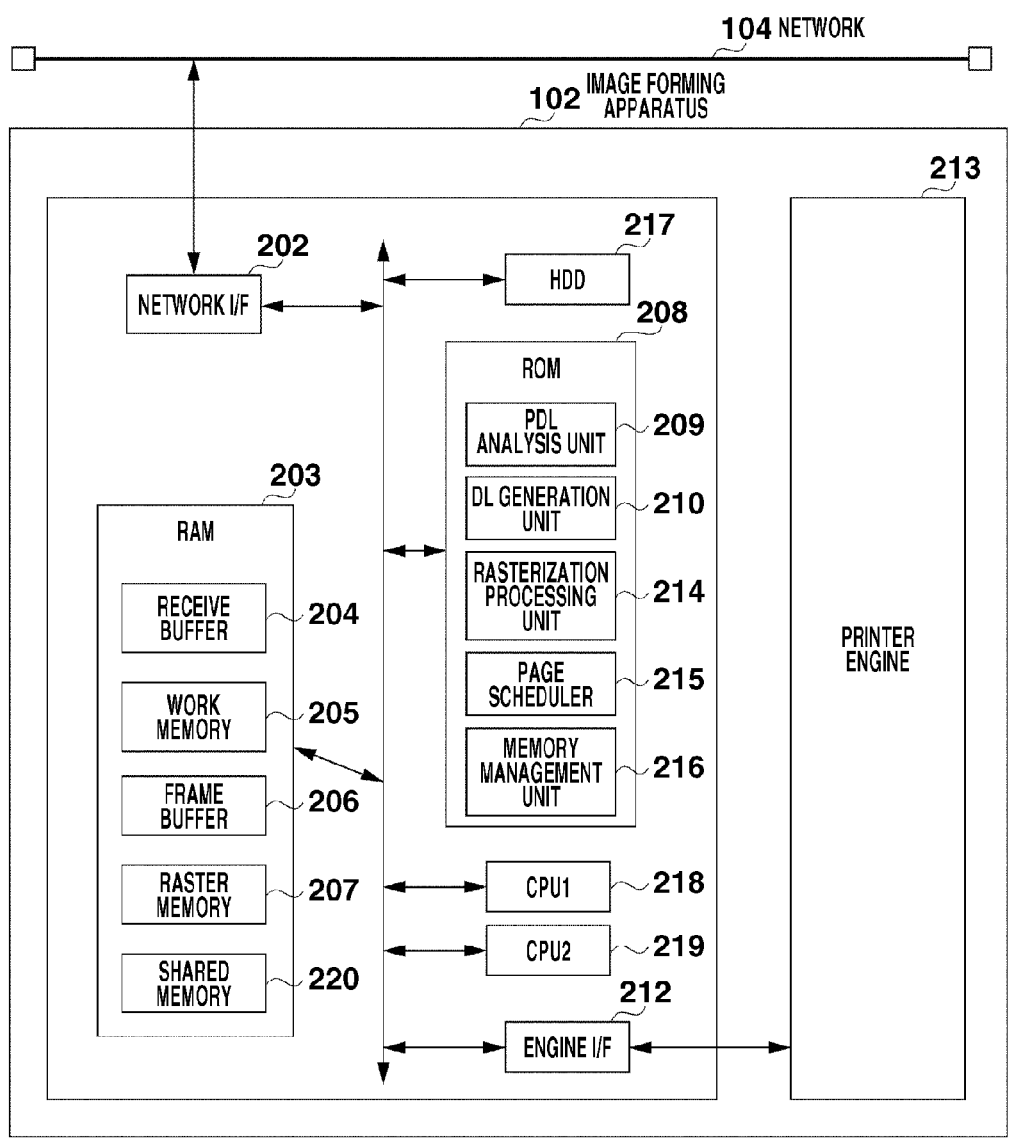
FIG. 1 illustrates an example of a system configuration of an image forming apparatus according to an exemplary embodiment of the present invention.

FIG. 1 illustrates an example of a system configuration of an image forming apparatus (print data processing apparatus) 102 according to a first exemplary embodiment of the present invention.

A network I/F 202 is used for transmitting/receiving information to/from an external device. The network I/F 202 receives print data sent from an external device. A RAM 203 temporarily stores various types of information. The RAM 203 includes a receive buffer 204, a work memory 205, a frame buffer 206, a raster memory 207, and a shared memory 220.

The receive buffer 204 is a memory that stores print data (also called as PDL data) received via the network I/F 202. The work memory 205 is temporarily used when the input print data is converted into an intermediate code. The frame buffer 206 stores intermediate codes in the printer. The raster memory 207 stores rasterized data which is obtained according to rasterization of the intermediate codes. The shared memory 220 can be accessed from a program stored in a ROM 208 that runs by a first processing unit (CPU1) 218 or a second processing unit (CPU2) 219.

The ROM 208 stores control code for the CPU1 218 or the CPU2 219 of the image forming apparatus 102. The ROM 208 includes programs of a PDL analysis unit 209, a DL (intermediate data) generation unit 210, a rasterization processing unit 214, a page scheduler 215, and a memory management unit 216. The print data processing method according to the first exemplary embodiment is realized by a computer (CPU or memory) executing these programs. Thus, these programs (or a part of these programs) are called a print data processing program.

The PDL analysis unit 209 identifies the type of PDL of the data read out from the receive buffer 204 out of a plurality of types of PDLs, analyzes the PDL data, and classifies the PDL data according to predetermined processing. The DL generation unit 210 generates intermediate data from the data analyzed by the PDL analysis unit 209, and stores the generated intermediate data in the frame buffer 206. The rasterization processing unit 214 stores bitmap data in the raster memory 207. The bitmap data is obtained by rasterizing the intermediate data stored in the frame buffer 206.

The page scheduler 215 requests the PDL analysis units 209 and the DL generation units 210 which operate according to the instructions given by the CPU1 218 and the CPU2 219 to process each page of the PDL data. The memory management unit 216 manages the frame buffer 206 used by the DL generation unit 210 which is operated by the CPU1 218 and the CPU2 219. Each function of the programs stored in the ROM 208 is realized by the CPU1 218 or the CPU2 219 executing the programs.

The CPU1 218 and the CPU2 219 are central processing units that perform calculation processing and control of the image forming apparatus 102. According to the present embodiment, the CPU1 218 is also called as a first processor and the CPU2 219 is also called as a second processor. An engine I/F 212 is used for transmitting/receiving signals to/from a printer engine 213. The printer engine 213 forms a latent image on a photosensitive drum based on image data according to a known electrophotographic process. Then, an image is printed by transferring the latent image onto a print sheet and fixing it.

Figure 2:
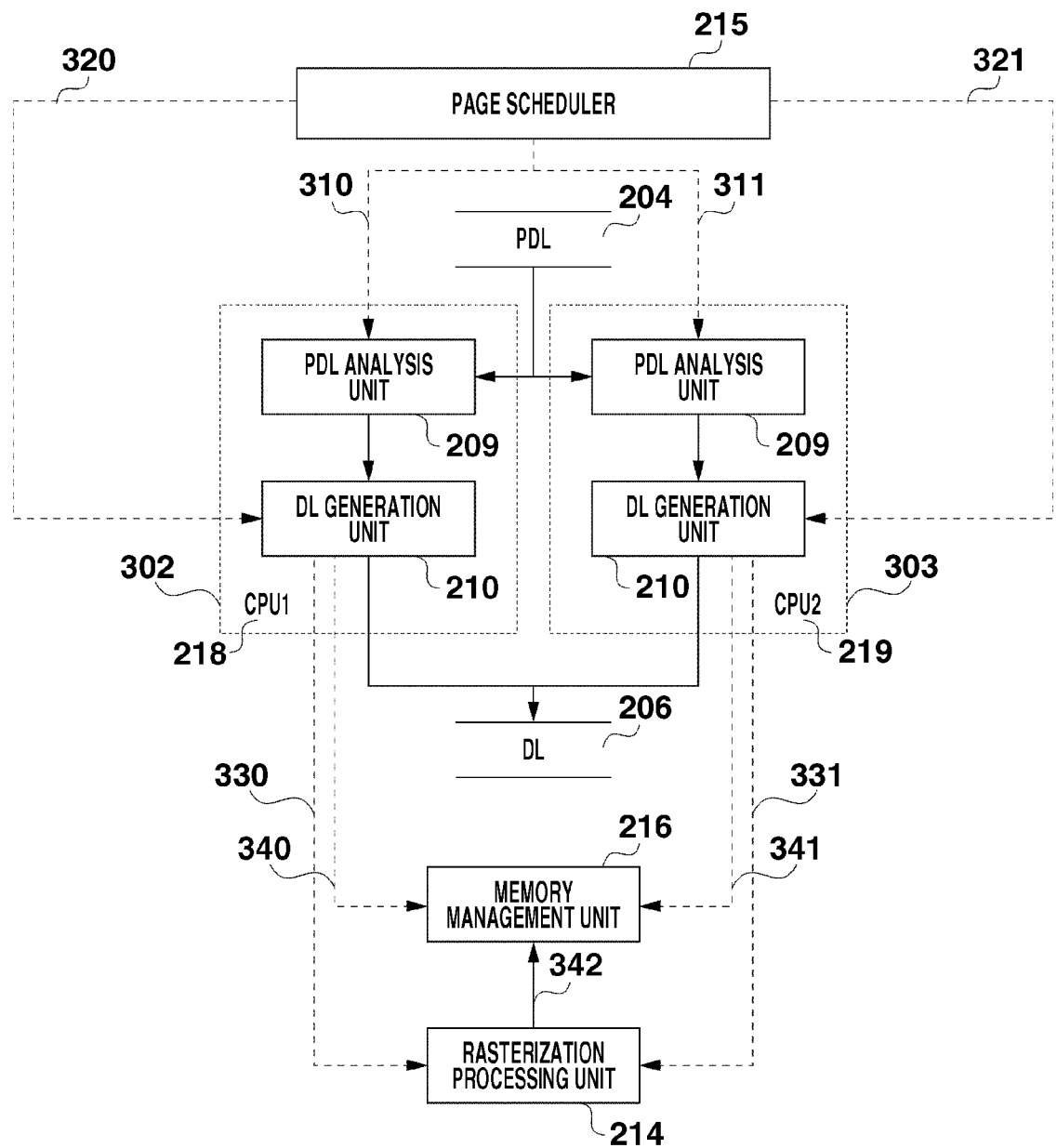
FIG. 2 illustrates an example of a module configuration of the image forming apparatus according to an exemplary embodiment of the present invention.

FIG. 2 illustrates an example of a module configuration of the image forming apparatus 102 according to an exemplary embodiment of the present invention.

A module 302 is executed by the CPU1 218. The module 302 indicates that the PDL analysis unit 209 and the DL generation unit 210 run on the CPU1 218. A module 303 is executed by the CPU2 219. The module 303 indicates that the PDL analysis unit 209 and the DL generation unit 210 run on the CPU2 219.

A dotted line 310 indicates that the PDL analysis unit 209 of the CPU1 218 is controlled by the page scheduler 215. A dotted line 311 indicates that the PDL analysis unit 209 of the CPU2 219 is controlled by the page scheduler 215. The control performed by the page scheduler 215 is based on function call and communication between processors.

The PDL analysis unit 209 which runs on the CPU1 218 reads the PDL data stored in the receive buffer 204 according to the control indicated by the dotted line 310 of the page scheduler 215. The DL generation unit 210 which runs on the CPU1 218 performs DL generation processing according to the data transmitted from the PDL analysis unit 209. Further, the DL generation unit 210 sends a memory acquisition request 340 to the memory management unit 216 and acquires memory from the frame buffer 206. The DL is stored in the acquired memory. When the processing of a page is completed, the DL generation unit 210 sends a rendering request 330 to the rasterization processing unit 214. The PDL analysis unit 209 and the DL generation unit 210 that run on the CPU2 219 perform similar processing.

When the rasterization processing unit 214 receives the rendering request 330 or 331 from the DL generation units 210, it performs rendering of the DL stored in the frame buffer 206 and generates bitmap data. When the rendering operation is completed, the rasterization processing unit 214 sends a memory deallocation request 342 to the memory management unit 216.

If the memory management unit 216 receives the memory acquisition request 340 or 341 from the DL generation unit 210, an address of an unused memory area in the frame buffer 206 is returned to the DL generation unit 210, and the unused memory area is changed to a used area. Further, if the memory management unit 216 receives a memory deallocation request 342 from the rasterization processing unit 214, the address of the memory to be deallocated is changed to an unused area. According to the above-described module configuration, the page parallel processing of the PDL is realized. A hard disk drive (HDD) 217 is a storage unit where data is stored. A mass storage drive such as a silicon disk drive (SDD) can also be used as the HDD 217.

Figure 3:
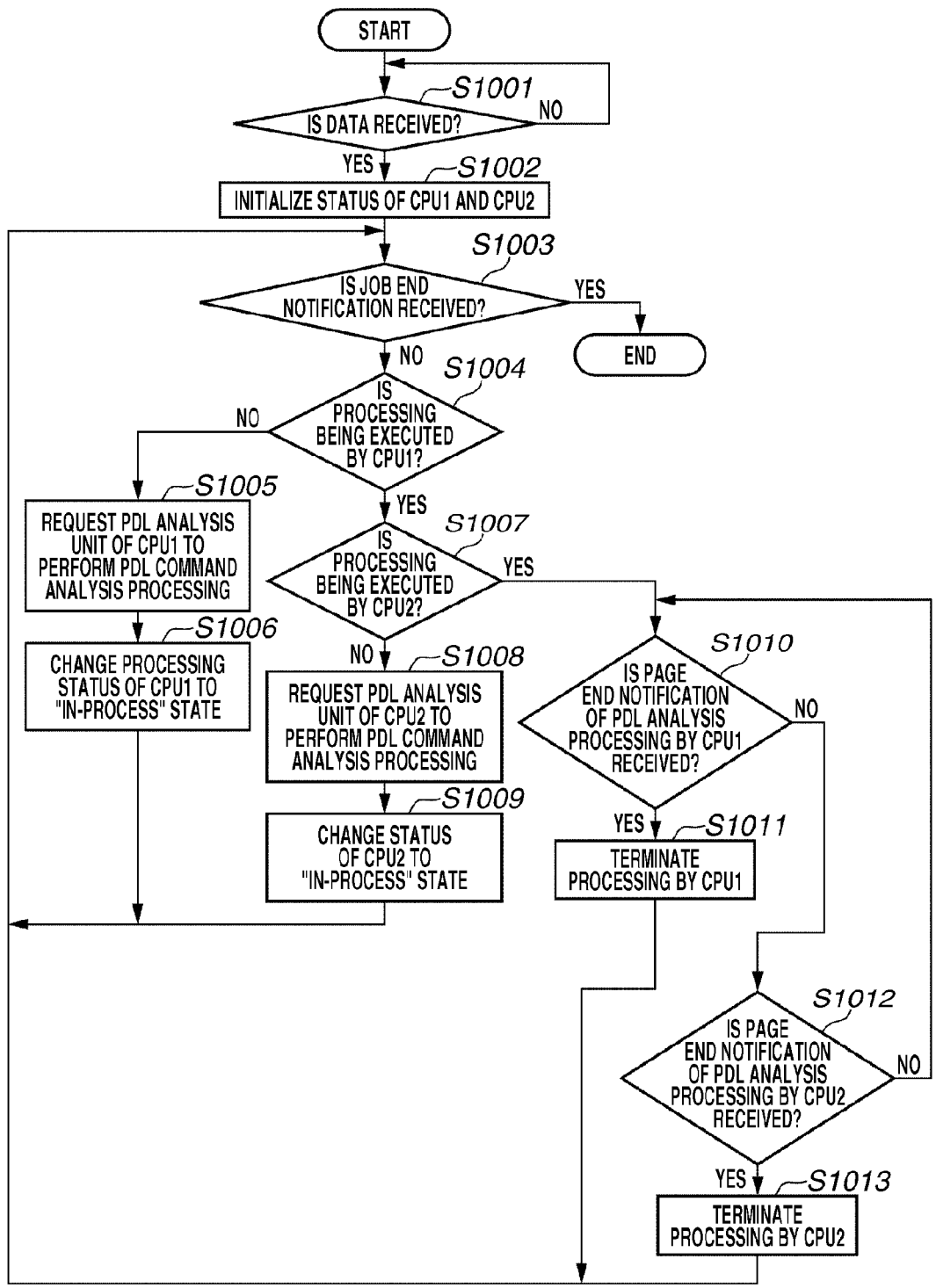
FIG. 3 is a flowchart illustrating an example of print processing according to a first exemplary embodiment of the present invention.

FIG. 3 is a flowchart illustrating an example of page scheduling processing according to the present embodiment.

In step S1001, the page scheduler 215 determines whether data sent from an apparatus (e.g., a PC) connected to a network 104 is received by the network I/F 202 via the network 104. If the data is received (YES in step S1001), the page scheduler 215 stores the received data in the receive buffer 204, and the processing proceeds to step S1002. If the data is not received (NO in step S1001), the processing in step S1001 is repeated. In step S1002, the page scheduler 215 initializes Proc1Status, which is a processing status of the CPU1 218 as well as Proc2Status, which is a processing status of the CPU2 219.

In step S1003, the page scheduler 215 determines whether a job end notification is received. If the job end notification is not received (NO in step S1003), the processing proceeds to step S1004. In step S1004, the page scheduler 215 determines whether the CPU1 218 is executing processing, in other words, whether the Proc1Status being the processing status of the CPU1 218 is TRUE. If the CPU1 218 is executing processing (i.e., Proc1Status is TRUE) (YES in step S1004), the processing proceeds to step S1007. In step S1007, the page scheduler 215 determines whether the CPU2 219 is executing processing, in other words, whether the Proc2Status being the processing status of the CPU2 219 is TRUE. If the CPU2 219 is not executing processing of any kind (i.e., Proc2Status is FALSE) (NO in step S1007), the processing proceeds to step S1008. In step S1008, the page scheduler 215 requests the PDL analysis unit 209 of the CPU2 219 to perform the PDL command analysis processing. In step S1009, the page scheduler 215 sets the processing status of the CPU2 219 to "in-process" (i.e., Proc2Status is TRUE), and then the processing returns to step S1003.

In step S1004, if the CPU1 218 is not executing processing of any kind (i.e., the Proc1Status is FALSE) (NO in step S1004), the processing proceeds to step S1005. In step S1005, the page scheduler 215 requests the PDL analysis unit 209 of the CPU1 218 to perform the command analysis processing. In step S1006, the page scheduler 215 sets the processing status of the CPU1 218 to "in-process" (i.e., Proc1Status is TRUE), and then the processing returns to step S1003. On the other hand, in step S1007, if the page scheduler 215 determines that the CPU2 219 is executing processing (i.e., Proc2Status is TRUE) (YES in step S1007), the processing proceeds to step S1010. In step S1010, the page scheduler 215 determines whether a page end notification sent from the PDL analysis of the CPU1 218 is received. In step S1010, if the CPU1 218 is executing page processing of the PDL analysis (NO in step S1010), the processing proceeds to step S1012. In step S1012, the page scheduler 215 determines whether a page end notification sent from the PDL analysis of the CPU2 219 is received.

In step S1012, if the CPU2 219 is executing page processing of the PDL analysis (NO in step S1012), the processing returns to step S1010. In step S1010, if the page scheduler 215 determines that a page end notification of the PDL analysis by the CPU1 218 is received (YES in step S1010), the processing proceeds to step S1011. In step S1011, the page scheduler 215 sets the CPU1 218 to the not-in-process state (i.e., Proc1Status is FALSE), and then the processing returns to step S1003.

In step S1012, if the page scheduler 215 determines that a page end notification of the PDL analysis by the CPU2 219 is received (YES in step S1012), the processing proceeds to step S1013. In step S1013, the page scheduler 215 sets the CPU2 219 to the not-in-process state (i.e., the Proc2Status is FALSE), and then the processing returns to step S1003. In step S1003, if the job end notification is received, the processing ends.

Figure 4:
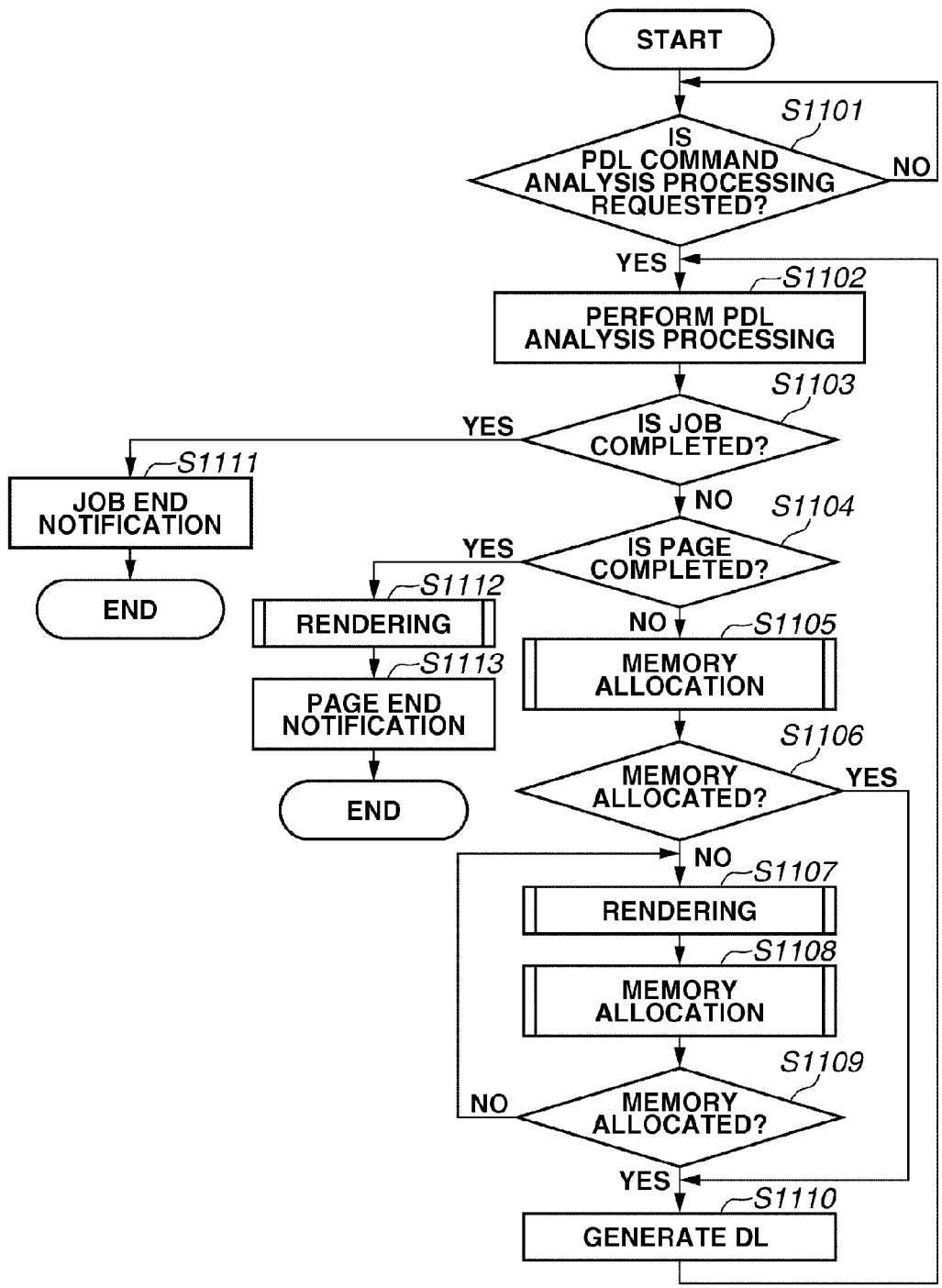
FIG. 4 is a flowchart illustrating an example of PDL command analysis processing according to the first exemplary embodiment.

FIG. 4 is a flowchart illustrating an example of the PDL command analysis processing executed by the PDL analysis unit 209 according to the present embodiment.

In step S1101, the PDL analysis unit 209 determines whether a PDL command analysis processing request is received from the page scheduler 215. If the PDL command analysis processing request is received (YES in step S1101), the processing proceeds to step S1102. In step S1102, the PDL analysis unit 209 performs PDL analysis of the data stored in the receive buffer 204. In step S1103, the PDL analysis unit 209 determines whether a job is completed. If the job is not completed (NO in step S1103), the processing proceeds to step S1104. In step S1104, the PDL analysis unit 209 determines whether processing of a page is completed. If processing of the page is not completed (NO in step S1104), the processing proceeds to step S1105. In step S1105, the DL generation unit 210 sends a memory allocation request to the memory management unit 216.

In step S1106, the DL generation unit 210 determines whether the memory allocation is successfully completed. If the memory allocation is not successfully completed (NO in step S1106), the processing proceeds to step S1107. In step S1107, the rasterization processing unit 214 performs rendering processing of the DL that has been generated by that time. In step S1108, the DL generation unit 210 sends a memory allocation request to the memory management unit 216 again. In step S1109, the DL generation unit 210 determines whether the memory allocation is successfully completed. If the memory allocation is not successfully completed (NO in step S1109), the processing returns to step S1107 and the rendering processing is repeated. After then, a memory allocation request is sent in step S1108.

In step S1106 or S1109, if memory is successfully allocated (YES in step S1106 or S1109), the processing proceeds to step S1110. In step S1110, the DL generation unit 210 performs the DL generation. When the DL generation is completed, the processing returns to step S1102. In step S1102, the next PDL command analysis processing is performed. In step S1103, if the job is successfully completed (YES in step S1103), the processing proceeds to step S1111. In step S1111, the PDL analysis unit 209 sends a job end notification to the page scheduler 215. In step S1104, if processing of the page is completed (YES in step S1104), the processing proceeds to step S1112. In step S1112, the rasterization processing unit 214 performs the rendering processing. In step S1113, a page end notification is sent to the page scheduler 215.

Figure 5:
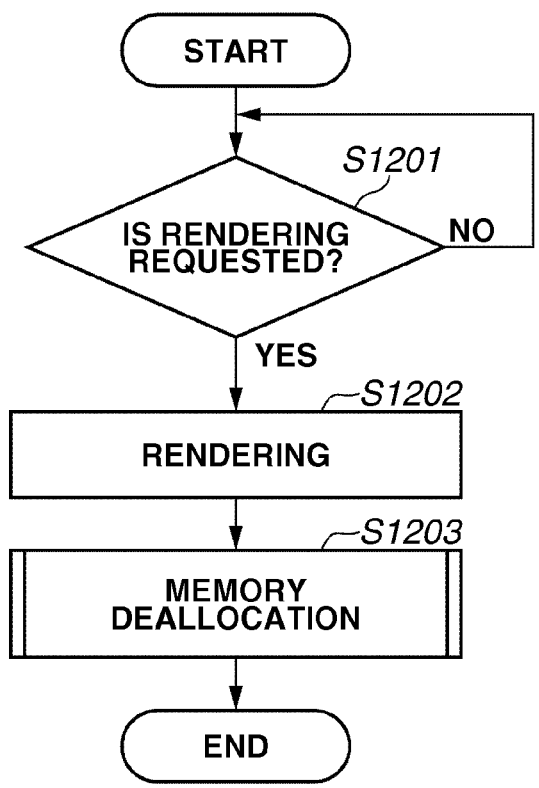
FIG. 5 is a flowchart illustrating an example of rendering according to the first exemplary embodiment.

FIG. 5 is a flowchart illustrating an example of the rendering processing according to the present exemplary embodiment.

In step S1201, the rasterization processing unit 214 determines whether a rendering request is received. If the rendering request is received (YES in step S1201), the processing proceeds to step S1202. If the rendering request is not received (NO in step S1201), then the processing in step S1201 is repeated. In step S1202, the rasterization processing unit 214 performs the rendering processing. In step S1203, the rasterization processing unit 214 sends a memory deallocation request to the memory management unit 216, and then the processing ends.

Figure 6:
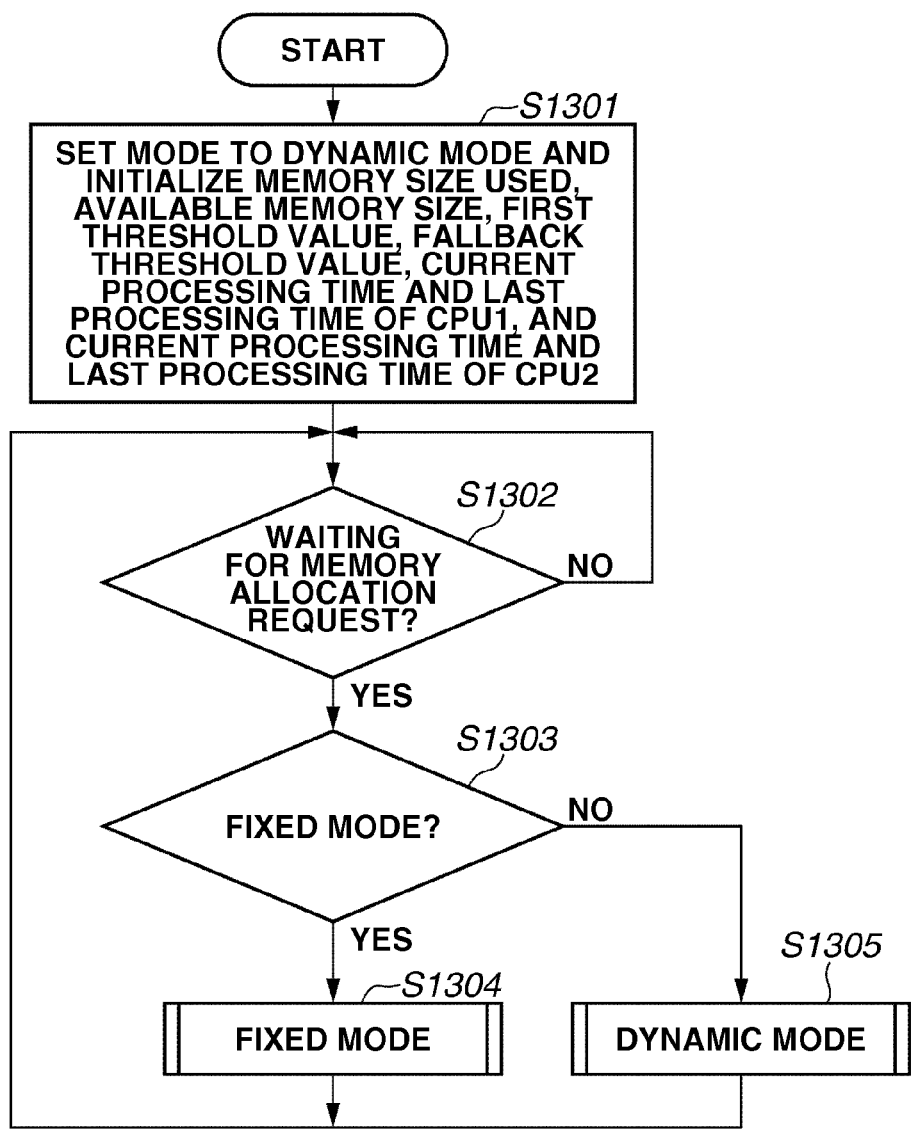
FIG. 6 is a flowchart illustrating an example of memory allocation according to the first exemplary embodiment.

FIG. 6 is a flowchart illustrating an example of the memory allocation processing according to the present embodiment.

In step S1301, the memory management unit 216 performs initialization. In step S1302, the memory management unit 216 determines whether the memory management unit 216 is waiting for a memory acquisition request. If the memory management unit 216 is determined to be waiting for a memory acquisition request (YES in step S1302), then the processing proceeds to step S1303. If not (NO in step S1302), the processing in step S1302 is repeated. In step S1303, the memory management unit 216 determines whether the memory is to be acquired in the fixed mode or in the dynamic mode.

If the memory is to be acquired in the fixed mode (FixedMode is TRUE) (YES in step S1303), the processing proceeds to step S1304. If the memory is to be acquired in the dynamic mode (FixedMode is FALSE) (NO in step S1303), the processing proceeds to step S1305. The dynamic mode is a mode used for allocating an unused memory area according to a memory acquisition request given by a processor. The fixed mode is a mode used for allocating an unused memory area to each processor in advance so that each processor is allocated only a memory area that is determined in advance. In step S1304, the memory is acquired in the fixed mode. In step S1305, the memory is acquired in the dynamic mode.

Figure 7B:
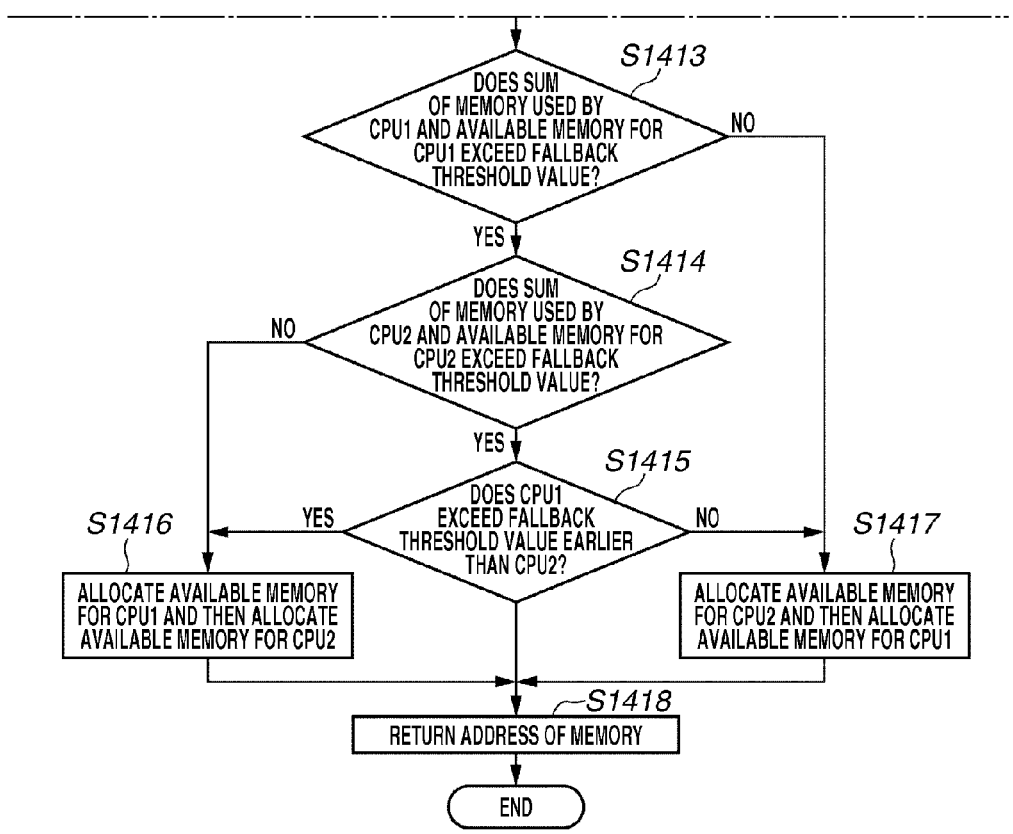
FIG. 7, composed of FIGS. 7A and 7B, is a flowchart illustrating an example of dynamic mode processing according to the first exemplary embodiment.

FIG. 7, composed of FIGS. 7A and 7B, is a flowchart illustrating an example of the dynamic mode processing according to the present embodiment. This processing is executed by the memory management unit 216.

In step S1401, the memory management unit 216 substitutes the current time for CurTime (e.g., 0 hours, 1 minute). In step S1402, the memory management unit 216 determines whether allocation of the memory of the first processor is requested. If allocation of the memory of the first processor is requested (YES in step S1402), the processing proceeds to step S1403. If allocation of the memory of the second processor is requested (NO in step S1402), the processing proceeds to step S1407.

In step S1403, the memory management unit 216 determines whether PreTime1, which is the last memory allocation time, is a time other than "0". If PreTime1 is not "0" (e.g., 0 hours, 0 min) (YES in step S1403), then the processing proceeds to step S1404. In step S1404, the memory management unit 216 adds the value of the time elapsed from when the memory has been allocated last time (i.e., CurTime−Pretime1) to time Time1, which is the time used in the processing of the first processor. In this case, "1" is added.

On the other hand, in step S1403, if PreTime1 is "0" (NO in step S1403), the processing proceeds to step S1405. In step S1405, the memory management unit 216 adds 1 to UsedSize1, which is the memory size allocated for the first processor, and subtracts 1 from FreeSize, which is the deallocated memory size. In step S1406, the memory management unit 216 substitutes CurTime for PreTime1. If 1 is added to UsedSize1 or UsedSize2, a memory area of a predetermined size is allocated to the corresponding processor. For example, according to the present embodiment, if 1 is added to UsedSize1, a memory area of 8 kilobytes will be allocated to the first processor.

In step S1402, if the memory management unit 216 determines that the memory allocation of the second processor is requested (NO in step S1402), the processing proceeds to step S1407. In step S1407, the memory management unit 216 determines whether PreTime2, which is the last memory allocation time, is a time other than "0". If PreTime2 is not "0" (YES in step S1407), then the processing proceeds to step S1408. In step S1408, the memory management unit 216 adds the value of the time elapsed from when the memory has been allocated last time (i.e., CurTime−Pretime2) to time Time2, which is the time used for the processing of the second processor.

On the other hand, in step S1407, if PreTime2 is 0 (NO in step S1407), then the processing proceeds to step S1409. In step S1409, the memory management unit 216 adds 1 to the memory usage (UsedSize2) of the second processor and subtracts 1 from FreeSize being the deallocated memory size. In step S1410, the memory management unit 216 substitutes CurTime for PreTime2. After the substitution processing is performed in S1406 of the first processor or step S1410 of the second processor, the memory management unit 216 performs threshold determination.

In step S1411, in order to determine whether a sum of the memory areas used by the first processor and the second processor exceeds a threshold value, the memory management unit 216 calculates and determines whether UsedSize1+UsedSize2>=ChkTh. In other words, whether a sum of the memory areas allocated to both the first processor and the second processor exceeds the threshold value is determined. If a sum of the memory areas allocated to the processors exceeds the threshold value (YES in step S1411), the processing proceeds to step S1412. If not (NO in step S1411), the processing ends. In step S1412, in order to change the dynamic mode to the fixed mode, the memory management unit 216 substitutes TRUE for FALSE of the FixedMode. After then, the memory management unit 216 determines the size of the memory which has been used. In step S1413, in order to determine whether a sum of the memory areas used by the first processor and the memory area allocated to the first processor exceeds a fallback threshold value, the memory management unit 216 calculates and determines whether UsedSize1+FreeSize>=FBTh.

If the sum of the used memory area and the allocated memory area exceeds the fallback threshold value (YES in step S1413), the processing proceeds to step S1414. In step S1414, in order to determine whether a sum of the memory area used by the second processor and the memory area allocated to the second processor exceeds the fallback threshold value, the memory management unit 216 calculates and determines whether UsedSize2+FreeSize>=FBTh.

If the sum of the memory areas exceeds the fallback threshold value (YES in step S1414), the processing proceeds to step S1415. In step S1415, the memory management unit 216 compares whether the time the amount of memory exceeds the fallback threshold value with respect to the first processor is faster than the time the amount of memory exceeds the fallback threshold value with respect to the second processor. The time the amount of memory exceeds the fallback threshold value is calculated according to the formula below.

First, the processing speed is acquired according to the following equation.

(processing speed of an $n$-th processor)=(time required for the $n$-th processor to generate intermediate data)/(amount of memory used for the $n$-th processor to generate intermediate data)

Then, by using the acquired processing speed, the time required until the amount of memory exceeds the fallback threshold value is calculated according to the following equation.

(time required until the amount of memory exceeds the fallback threshold value)=(amount of memory to be used by the $n$-th processor until the amount of memory exceeds the fallback value)/(processing speed)

In the above equations, n is either 1 or 2. Then, the memory management unit 216 compares the time required until the amount of memory exceeds the fallback threshold value with respect to the first processor and the time required until the amount of memory exceeds the fallback threshold value with respect to the second processor.

As a result of the comparison, if the speed of the first processor is determined to be faster (YES in step S1415), the processing proceeds to step S1416. In step S1416, the memory is first allocated to the first processor. The size of the allocated memory is calculated according to the following equation.

$$FreeSize1 = FBSize - UsedSize1$$

After then, the memory is allocated to the second processor. The size of the memory allocated to the second processor is calculated according to the following equation.

$$FreeSize2 = FreeSize - FreeSize1$$

On the other hand, if the speed of the second processor is determined to be faster (NO in step S1415), then the processing proceeds to step S1417. In step S1417, the memory is first allocated to the second processor. The size of the allocated memory is calculated according to the following equation.

$$FreeSize2 = FBSize - UsedSize2$$

After then, the memory is allocated to the first processor. The size of the memory allocated to the first processor is calculated according to the following equation.

$$FreeSize1 = FreeSize - FreeSize2$$

In step S1418, the address of each memory is returned.

Figure 8:
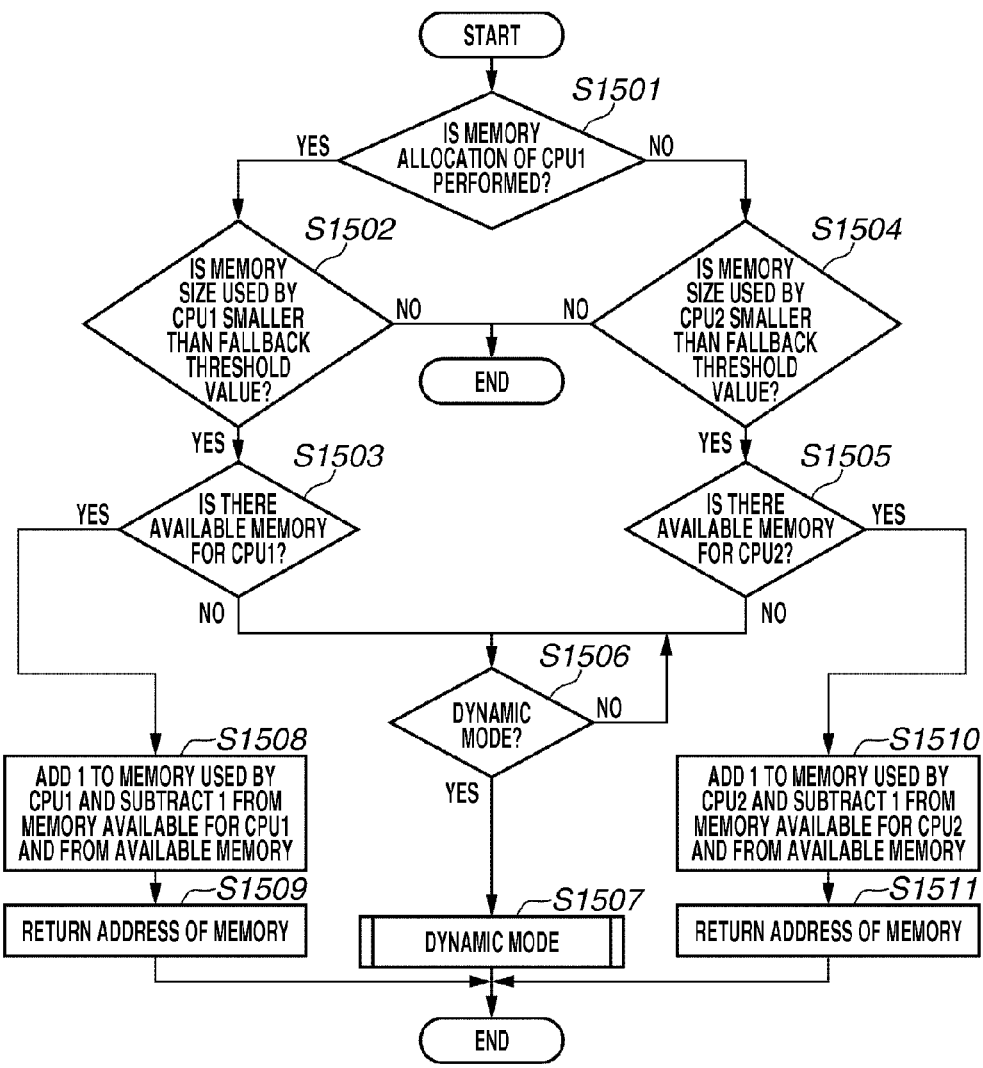
FIG. 8 is a flowchart illustrating an example of fixed mode processing according to the first exemplary embodiment.

FIG. 8 is a flowchart illustrating an example of fixed mode processing according to the present exemplary embodiment.

In step S1501, the memory management unit 216 determines whether the memory of the first processor is allocated. If the memory of the first processor is allocated (YES in step S1501), the processing proceeds to step S1501. If the memory of the second processor is allocated (NO in step S1501), the processing proceeds to step S1504.

In step S1502, the memory management unit 216 determines whether the amount of memory used by the first processor is smaller than the fallback threshold value (UsedSize1<FBTh). If the amount of the used memory is equal to or greater than the fallback threshold value (NO in step S1502), the memory management unit 216 returns a notification stating that the memory cannot be allocated, and the processing then ends. On the other hand, if the amount of the used memory is smaller than the fallback threshold value (YES in step S1502), the processing proceeds to step S1503. In step S1503, the memory management unit 216 determines whether there is a free memory area (FreeSize1>0). If the memory management unit 216 determines that there is no free memory (NO in step S1503), the processing proceeds to step S1506.

In step S1504, the memory management unit 216 determines whether the amount of memory used by the second processor is smaller than the fallback threshold value (UsedSize2<FBTh). If the amount of the used memory is equal to or greater than the fallback threshold value (NO in step S1504), the memory management unit 216 returns a notification stating that the memory cannot be allocated, and the processing then ends. On the other hand, if the amount of the used memory is smaller than the fallback threshold value (YES in step S1504), the processing proceeds to step S1505. In step S1505, the memory management unit 216 determines whether there is a memory area that can be allocated (FreeSize2>0). If the memory management unit 216 determines that there is no free memory (NO in step S1505), the processing proceeds to step S1506.

In step S1506, the memory management unit 216 determines whether the mode is the dynamic mode according to whether FixedMode is set to FALSE or not. If the mode is set to the fixed mode (NO in step S1506), the processing in step S1506 is repeated. If the mode is changed to the dynamic mode (YES in step S1506), the processing proceeds to step S1507. In step S1507, the dynamic mode processing is performed.

In step S1503, if the memory management unit 216 determines that there is free memory (YES in step S1503), the processing proceeds to step S1508. In step S1508, the memory management unit 216 adds 1 to the UsedSize1 and subtracts 1 from the FreeSize1 and the FreeSize. In step S1509, the address of the memory is returned. In step S1505, if the memory management unit 216 determines that there is free memory (YES in step S1505), the processing proceeds to step S1510. In step S1510, the memory management unit 216 adds 1 to the UsedSize2 and subtracts 1 from the FreeSize2 and the FreeSize. In step S1511, the address of the memory is returned.

Figure 9:
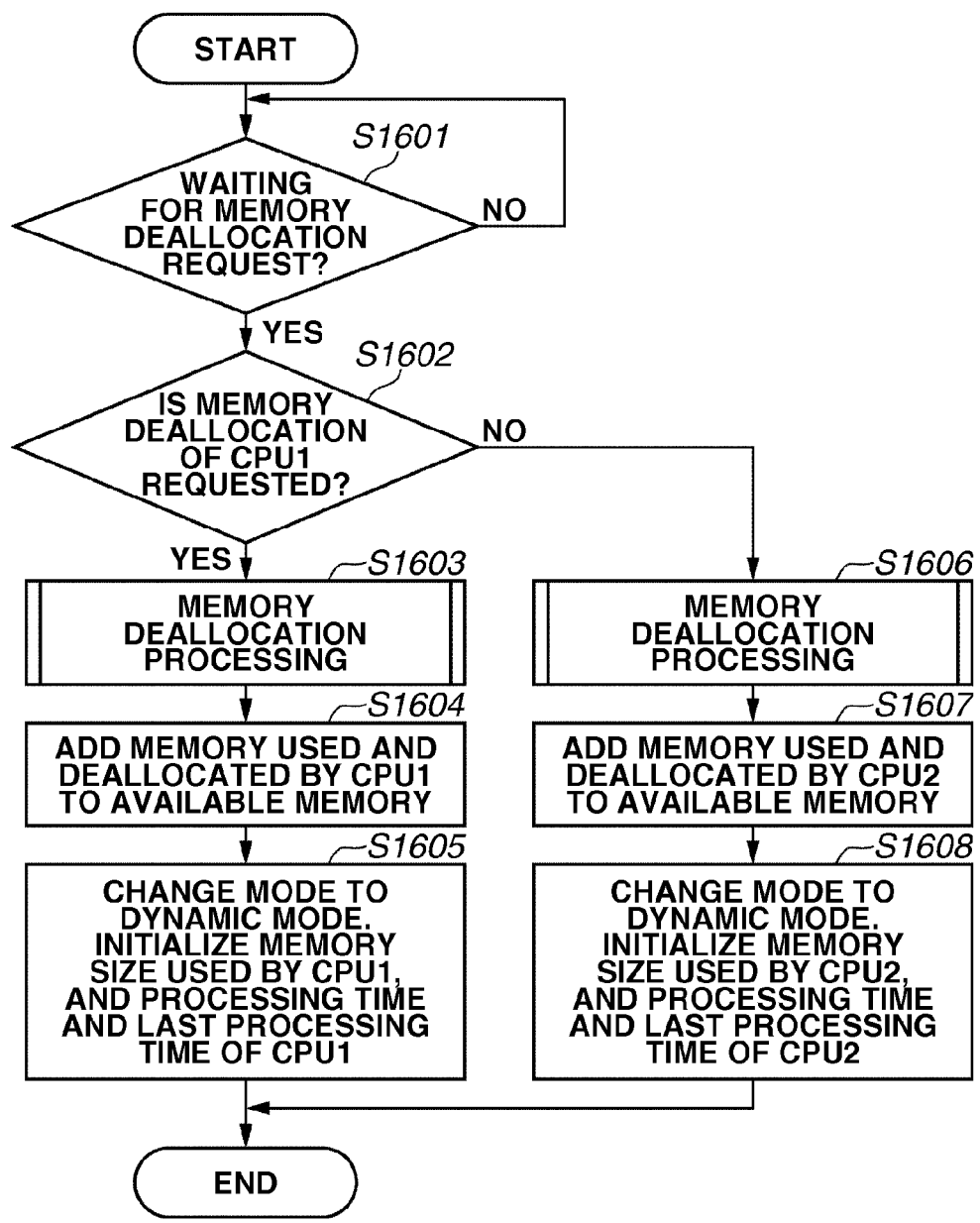
FIG. 9 is a flowchart illustrating an example of memory free according to the first exemplary embodiment.

FIG. 9 is a flowchart illustrating an example of memory free processing according to the present embodiment.

In step S1601, the memory management unit 216 determines whether a memory deallocation request is received. If the memory deallocation request is received (YES in step S1601), the processing proceeds to step S1602. If the memory deallocation request is not received (NO in step S1601), the processing in step S1601 is repeated. In step S1602, the memory management unit 216 determines whether the memory deallocation of the first processor or the second processor is requested. If the memory deallocation of the first processor is requested (YES in step S1602), then the processing proceeds to step S1603. In step S1603, the memory management unit 216 performs the memory deallocation processing of the first processor. In step S1604, the deallocated memory size is added (FreeSize=UsedSize1+FreeSize). In step S1605, the memory management unit 216 performs initialization by setting FixedMode to FALSE, setting UsedSize1, Time1, and PreTime1 to 0, and changing the mode to the dynamic mode.

On the other hand, in step S1602, if the memory deallocation of the second processor is requested (NO in step S1602), then the processing proceeds to step S1606. In step S1606, the memory management unit 216 performs the memory deallocation processing of the second processor. In step S1607, the deallocated memory size is added (FreeSize=UsedSize2+FreeSize). In step S1608, the memory management unit 216 performs initialization by setting FixedMode to FALSE, setting UsedSize2, Time2, and PreTime2 to 0, and changing the mode to the dynamic mode. According to steps S1605 and S1608, the memory areas allocated to the CPUs in the fixed mode are deallocated. Further, if the memory areas allocated to the CPUs do not exceed the threshold value, the memory areas will be allocated for the CPUs in the dynamic mode.

Figure 10:
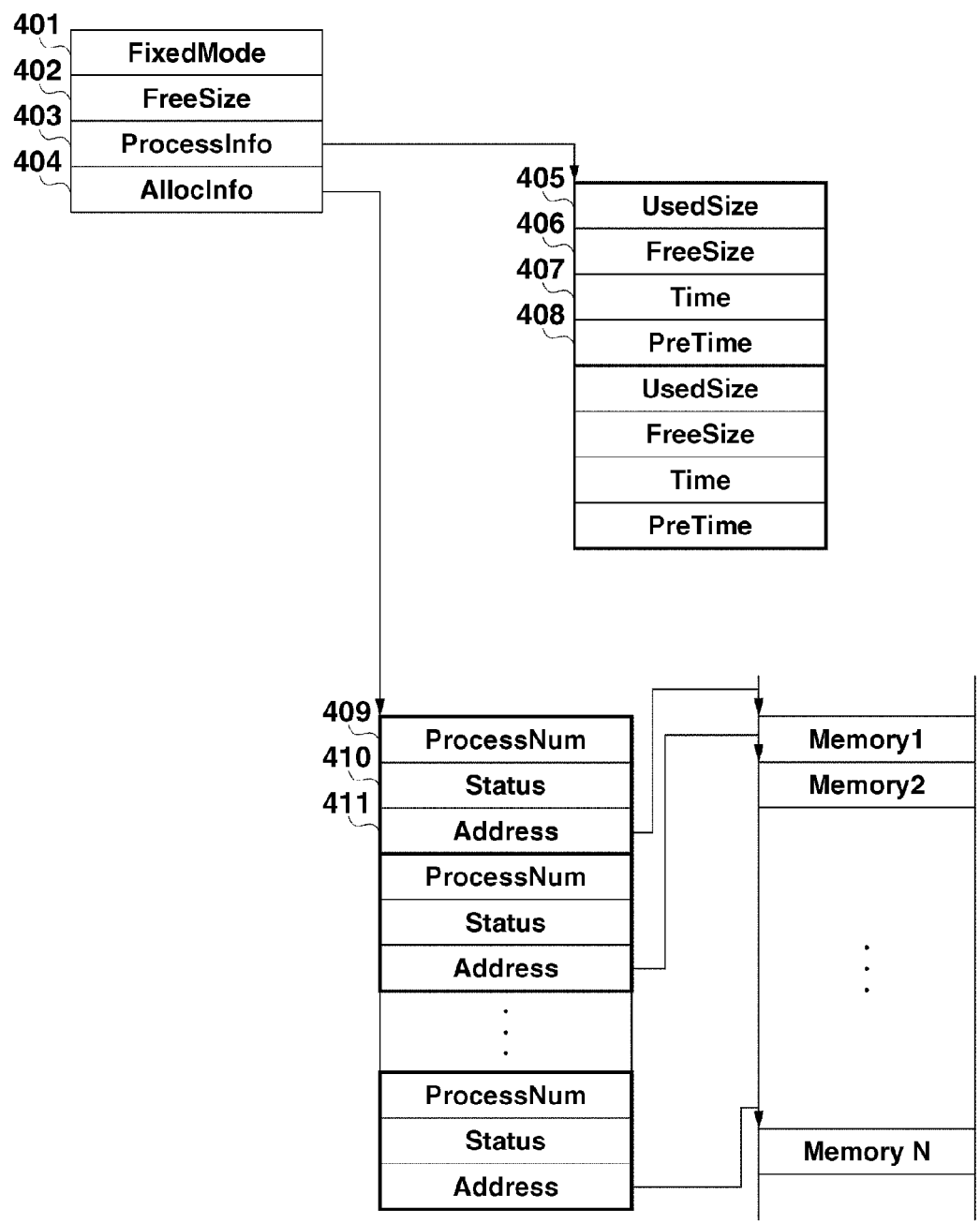
FIG. 10 illustrates an example of a configuration of memory management information according to the first exemplary embodiment.

FIG. 10 illustrates an example of a configuration of memory management information according to the present embodiment.

The memory management information includes four types of information: FixedMode 401, FreeSize 402, ProcessInfo 403, and AllocInfo 404. Three types of information of the memory, which are ProcessNum 409, Status 410, and Address 411, are included in AllocInfo 404. Further, UsedSize 405, FreeSize 406, Time 407, and PreTime 408 are included in ProcessInfo 403. FixedMode 401 is used for determining whether the mode is the fixed mode or the dynamic mode. FreeSize 402 indicates the size of free memory.

FIG. 11 illustrates an example of a relation between memory management and threshold value when the memory is used.

According to the example in FIG. 11, the threshold value of ChkTh is set to 4 and FBTh is set to 7. Free memory is allocated when ChkTh exceeds 4. In other words, free memory is allocated to Pages 1 and 2, and the memory management information is updated.

As described above, according to the first exemplary embodiment, the memory area corresponding to a fallback threshold value is allocated to the first processor or the second processor that exceeds the fallback value at timing earlier than the other processor. Then, the rest of the unused memory area is allocated to the other processor. In this manner, since fallback of the intermediate data of a certain memory area is always performed, image quality is stabilized.

According to the first exemplary embodiment, with respect to two processors, if a memory size exceeds a threshold value, memory is allocated to each processor. According to a second exemplary embodiment, with respect to two processors, if a memory size exceeds a threshold value, memory is allocated to each processor according to a memory usage ratio. Then, the remaining memory area is allocated to an arbitrary processor. The configurations and functions that are similar to those in the first exemplary embodiment are denoted by the same process numbers and their descriptions are not repeated.

Figure 12B:
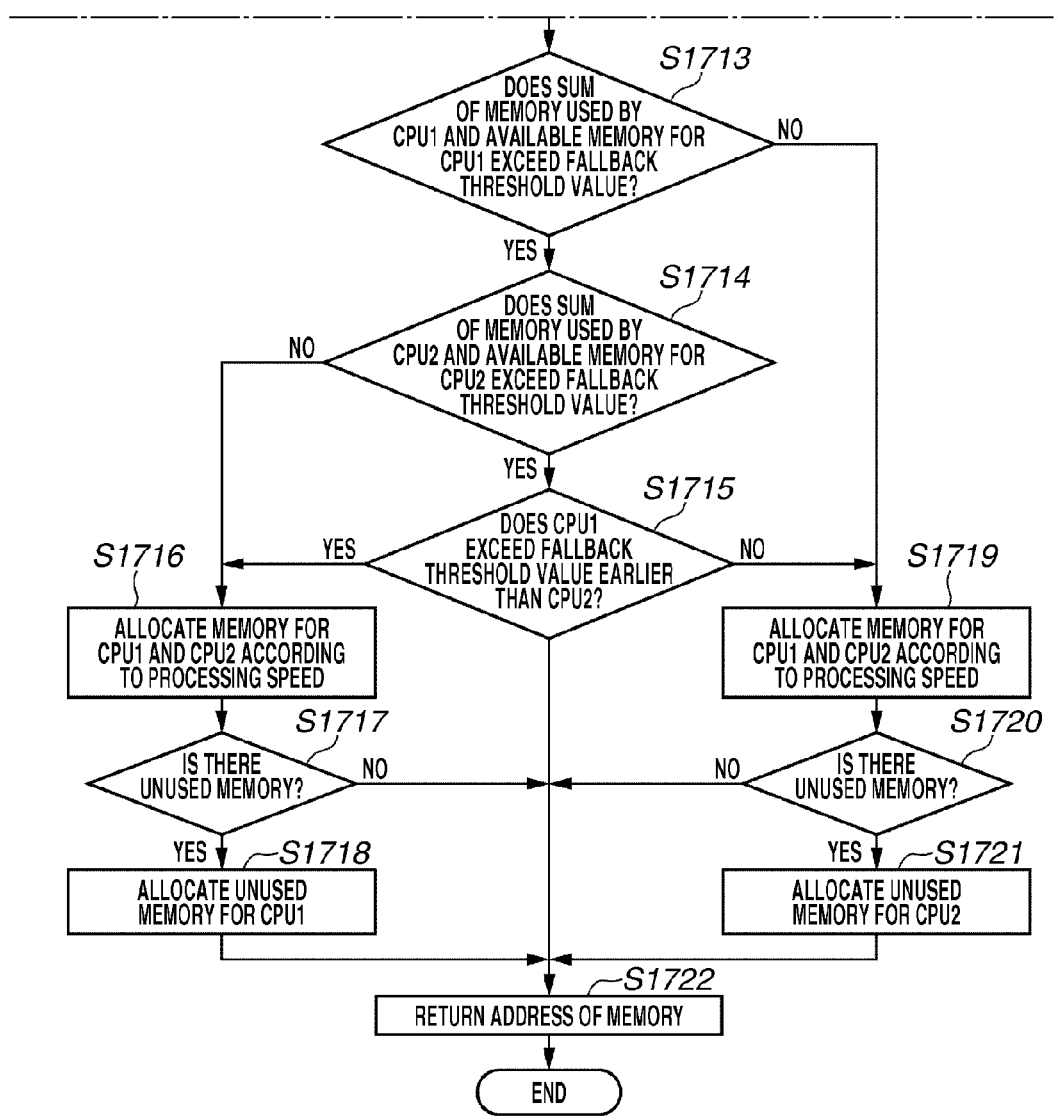
FIG. 12, composed of FIGS. 12A and 12B, is a flowchart illustrating an example of memory allocation and deallocation according to a second exemplary embodiment of the present invention.

FIG. 12, composed of FIGS. 12A and 12B, is a flowchart illustrating an example of the dynamic mode processing according to the second exemplary embodiment.

In step S1701, the memory management unit 216 substitutes the current time for CurTime. In step S1702, the memory management unit 216 determines whether allocation of the memory of the first processor is requested. If allocation of the memory of the first processor is requested (YES in step S1702), the processing proceeds to step S1703. If allocation of the memory of the second processor is requested (NO in step S1702), the processing proceeds to step S1707.

In step S1703, the memory management unit 216 determines whether PreTime1, which is the last memory allocation time, is a time other than "0". If PreTime1 is not "0" (YES in step S1703), then the processing proceeds to step S1704. In step S1704, the memory management unit 216 adds the value of the time elapsed from when the memory has been allocated last time (i.e., CurTime−Pretime1) to time Time1, which is the time used in the processing of the first processor. On the other hand, in step S1703, if PreTime1 is "0" (NO in step S1703), the processing proceeds to step S1705. In step S1705, the memory management unit 216 adds 1 to UsedSize1, which is the memory size allocated to the first processor, and subtracts 1 from FreeSize, which is the deallocated memory size. In step S1706, the memory management unit 216 substitutes CurTime for PreTime1.

On the other hand, in step S1702, if the memory management unit 216 determines that allocation of the memory of the second processor is requested (NO in step S1702), the processing proceeds to step S1707. In step S1707, the memory management unit 216 determines whether PreTime2, which is the last memory allocation time, is a time other than "0". If PreTime2 is not "0" (YES in step S1707), then the processing proceeds to step S1708. In step S1708, the memory management unit 216 adds the value of the time elapsed from when the memory has been allocated last time (i.e., CurTime−Pretime2) to time Time2, which is the time used in the processing of the second processor. On the other hand, in step S1707, if PreTime2 is "0" (NO in step S1707), the processing proceeds to step S1709.

In step S1709, the memory management unit 216 adds 1 to UsedSize2, which is the memory size allocated to the second processor, and subtracts 1 from FreeSize, which is the deallocated memory size. In step S1710, the memory management unit 216 substitutes CurTime for PreTime2. After the substitution processing is performed in S1706 of the first processor or step S1710 of the second processor, the memory management unit 216 performs the threshold determination.

In step S1711, in order to determine whether a sum of the memory areas used by the first processor and the second processor exceeds a threshold value, the memory management unit 216 calculates and determines whether UsedSize1+UsedSize2>=ChkTh. If the sum of the memory areas allocated to the processors exceeds the threshold value (YES in step S1711), the processing proceeds to step S1712. If not (NO in step S1711), the processing ends. In step S1712, in order to change the dynamic mode to the fixed mode, the memory management unit 216 substitutes TRUE for FALSE of the FixedMode. After then, the memory management unit 216 determines the size of the memory which has been used.

In step S1713, in order to determine whether a sum of the memory areas used by the first processor and the memory area allocated to the first processor exceeds a fallback threshold value, the memory management unit 216 calculates and determines whether UsedSize1+FreeSize>=FBTh. If the sum of the used memory area and the allocated memory area exceeds the fallback threshold value (YES in step S1713), the processing proceeds to step S1714. In step S1714, in order to determine whether a sum of the memory area used by the second processor and the memory area allocated to the second processor exceeds the fallback threshold value, the memory management unit 216 calculates and determines whether UsedSize2+FreeSize>=FBTh. If the sum of the memory areas exceeds the fallback threshold value (YES in step S1714), the processing proceeds to step S1715. In step S1715, the memory management unit 216 determines the processing speed of the processors until the amount of memory exceeds the fallback threshold value.

The processing speed is acquired according to the following equation.

$$\text{(processing speed of an } n\text{-th processor)} = \text{(time required for the } n\text{-th processor to generate intermediate data)} / \text{(amount of memory used for the } n\text{-th processor to generate intermediate data)}$$

Then, by using the acquired processing speed, the time required until the amount of memory exceeds the fallback threshold value is calculated according to the following equation.

$$\text{(time required until the amount of memory exceeds the fallback threshold value)} = \text{(amount of memory to be used by the } n\text{-th processor until the amount of memory exceeds the fallback value)} / \text{(processing speed)}$$

In the above equations, n is either 1 or 2.

The memory management unit 216 calculates the time that passes until the memory exceeds the fallback threshold value of the first processor and the time that passes until the memory exceeds the fallback threshold value of the second processor, and then compares the time. If the processing speed of the first processor is faster (YES in step S1715), the processing proceeds to step S1716. In step S1716, the memory management unit 216 allocates an amount of memory obtained according to the following equation to the first processor.

$$FreeSize1 = FBSize - UsedSize1$$

Next, the amount of memory allocated to the first processor or the second processor is calculated using the ratio of the memory which the CPU1 218 and the CPU2 219 have used according to the following equation.

$$FreeSize2 = FreeSize1 \times UsedSize2 / (UsedSize1 + UsedSize2)$$

In step S1717, the memory management unit 216 determines whether there is a free area according to the following equation.

(FreeSize−FreeSize1−FreeSize2)>0

If there is a free area, in step S1718, the memory management unit 216 further allocates the free memory area to the first processor of a higher processing speed.

In step S1715, if the processing speed of the first processor is slower (NO in step S1715), the processing proceeds to step S1719. In step S1719, the memory management unit 216 allocates an amount of memory obtained according to the following equation to the second processor.

FreeSize2=FBSize−UsedSize2

Next, the amount of memory allocated to the first processor or the second processor is calculated using the ratio of the memory which the CPU1 218 and the CPU2 219 have used according to the following equation.

FreeSize1=FreeSize2×UsedSize1/(UsedSize1+UsedSize2)

In step S1720, the memory management unit 216 determines whether there is a free area according to the following equation.

(FreeSize−FreeSize1−FreeSize2)>0

If there is a free area, in step S1721, the memory management unit 216 further allocates the free memory area to the second processor of a faster processing speed.

Figure 13:
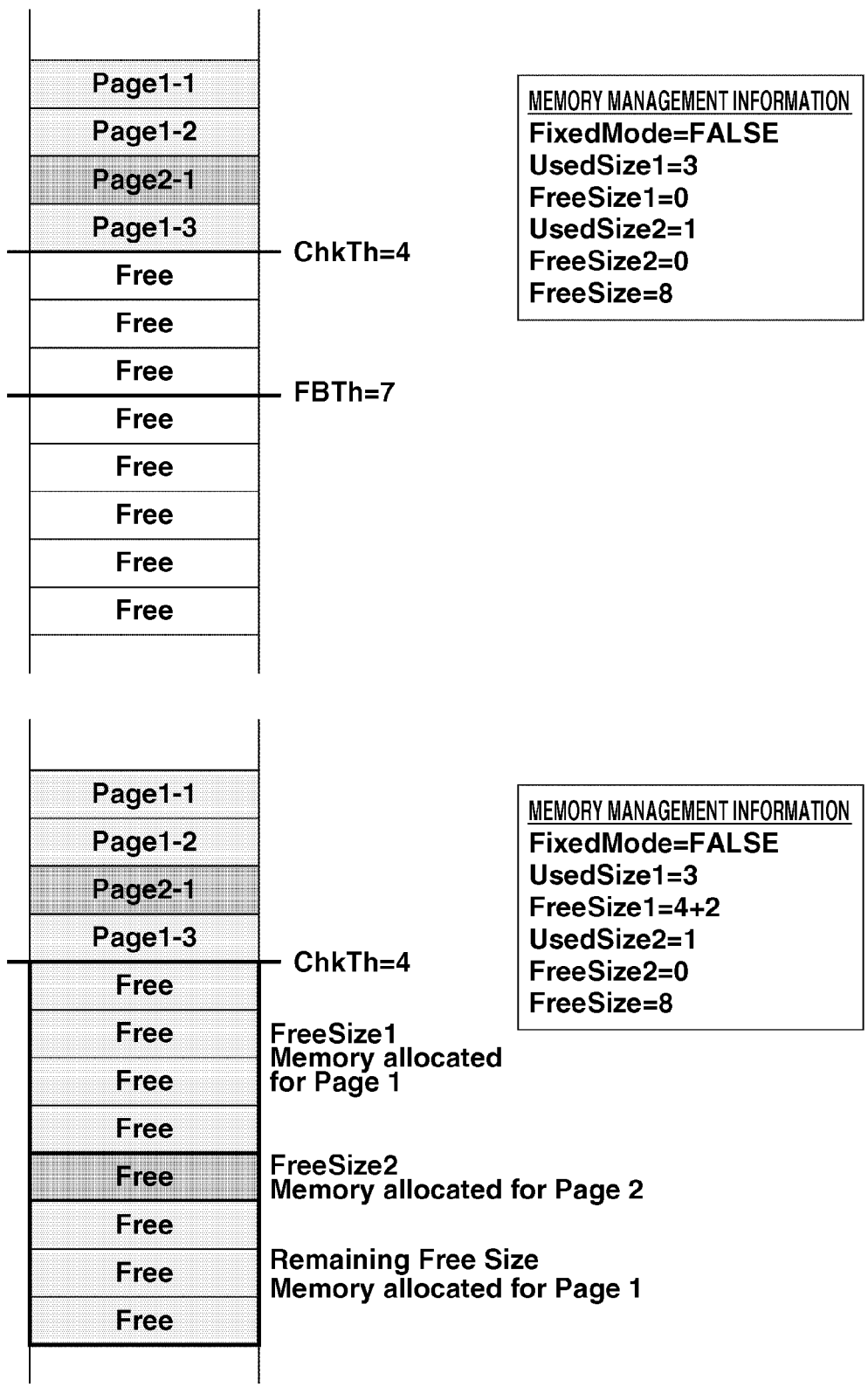
FIG. 13 illustrates an example of a relation between memory management and threshold value when the memory is used according to the second exemplary embodiment.

FIG. 13 illustrates an example of a relation between memory management and threshold value when the memory is used. According to the example in FIG. 13, the threshold value of ChkTh is set to 4 and FBTh is set to 7. Free memory is allocated when ChkTh exceeds 4. In other words, the free memory is allocated to Pages 1 and 2 according to a ratio of the processing speed of the first processor and the second processor.

In FIG. 13, four blocks are allocated to Page 1 and one block is allocated to Page 2. However, since three blocks of memory are free, the above-described three blocks are allocated to Page 1. Since the processing performed by the first processor is not cancelled, performance can be improved.

As described above, according to the second exemplary embodiment, the memory area corresponding to a fallback threshold value is allocated to the first processor or the second processor that exceeds the fallback value at timing earlier than the other processor. Then, based on a use ratio of the memory, the memory area to be allocated to the other processor is calculated, and memory corresponding to the calculated memory area is allocated. Further, if an unused memory area exists, the unused memory area is allocated to the processor which exceeds the fallback value at earlier timing. In this manner, since fallback of the intermediate data is larger with respect to the processor which exceeds the fallback value at earlier timing, the printing speed can be increased.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-288464 filed Dec. 18, 2009, which is hereby incorporated by reference herein in its entirety.

What is claimed is:

1. A print data processing apparatus comprising:
a reception unit configured to receive print data;
a first processor configured to generate intermediate data based on the print data received by the reception unit and store the generated intermediate data in a memory area;
a second processor, different from the first processor, configured to generate intermediate data based on the print data received by the reception unit and store the generated intermediate data in the memory area; and
a memory management unit configured to allocate memory of a predetermined size in an unused area of the memory area to the first processor or the second processor from which a memory acquisition request has been given;
wherein, if a size of memory allocated to both the first processor and the second processor by the memory management unit exceeds a predetermined value, the memory management unit allocates memory from an unused area of the memory area to one of the first and the second processors so that a size of the memory allocated to the one of the first and the second processors corresponds to a fallback threshold value, and memory of the remaining unused area is allocated to the other of the first and the second processors, and wherein one of the first and the second processors is a processor whose fallback timing is earlier than the other of the first and the second processors, wherein in determining the processor whose fallback timing is earlier, the memory management unit calculates the fallback timing according to the following mathematical expression:

(timing of fallback performed by processor)=(resource amount necessary until $n$-th processor performs fallback)/[(time required for $n$-th processor to generate intermediate data)/(resource amount of memory used by $n$-th processor in generating intermediate data)], where n=1 or 2, and determines the processor whose fallback timing is earlier based on a result of the calculation.

2. The print data processing apparatus according to claim 1, further comprising a rendering unit configured to render, if the one of the first and the second processors generates an intermediate code corresponding to the fallback threshold value, the intermediate code corresponding to the fallback threshold value generated by the one of the first and the second processors,
wherein, in response to rendering processing performed by the rendering unit, the memory management unit deallocates the memory area allocated to the one of the first and the second processors, and determines that the deallocated memory is an unused area, and further, if the size of the memory allocated to the first and the second processors no longer exceeds the threshold value due to the determination of the deallocated memory as the unused area, the memory management unit cancels the allocation of the unused area performed when the size of the memory allocated to the first and the second processors exceeds the threshold value, and allocates the memory in response to an acquisition request sent from the first and the second processors.

3. The print data processing apparatus according to claim 2, wherein, if the memory management unit allocates the unused area of the remaining memory to the other of the first and the second processors, the memory management unit allocates an entire unused area of the remaining memory to the other of the first and the second processors.

4. The print data processing apparatus according to claim 3, wherein, if the memory management unit allocates the unused area of the memory to the other of the first and the second processors, the memory management unit allocates memory to be allocated to the other of the first and the second processors from the unused area based on a use ratio of a size of the memory used by the first and the second processors for generating the intermediate code, and if an unused area remains even if a size of the memory allocated is removed, allocates the entire unused area to the one of the first and the second processors.

5. The print data processing apparatus according to claim 1, wherein the fallback is processing used for generating image data by rendering an intermediate code generated by a processor, compressing the generated image data, and storing an intermediate code used for rendering the compressed image data in the memory area when a data size of the intermediate code generated by the processor exceeds a data size of a predetermined fallback threshold value.

6. A print data processing method comprising:
   causing a reception unit to receive print data;
   causing a first processor to generate intermediate data based on the print data received by the reception unit and to store the generated intermediate data in a memory area;
   causing a second processor, different from the first processor, to generate intermediate data based on the print data received by the reception unit and to store the generated intermediate data in the memory area;
   causing a memory management unit to allocate memory of a predetermined size in an unused area of the memory area to the first processor or the second processor from which a memory acquisition request has been given;
   if a size of memory allocated to both the first and the second processors by the memory management unit exceeds a threshold value, causing the memory management unit to allocate memory from an unused area of the memory area to one of the first and the second processors, so that a size of the memory allocated to the one of the first and the second processors corresponds to a fallback threshold value, and memory of the remaining unused area is allocated to the other of the first and the second processors, and wherein one of the first and the second processors is a processor whose fallback timing is earlier than the other of the first and the second processors, wherein in determining the processor whose fallback timing is earlier, the memory management unit calculates the fallback timing according to the following mathematical expression:

(timing of fallback performed by processor)=(resource amount necessary until $n$-th processor performs fallback)/[(time required for $n$-th processor to generate intermediate data)/(resource amount of memory used by $n$-th processor in generating intermediate data)], where n=1 or 2, and determines the processor whose fallback timing is earlier based on a result of the calculation.

7. A non-transitory computer-readable storage medium storing a program for causing a computer to execute a print data processing method, comprising:
   causing a reception unit to receive print data;
   causing a first processor to generate intermediate data based on the print data received by the reception unit and to store the generated intermediate data in a memory area;
   causing a second processor, different from the first processor, to generate intermediate data based on the print data received by the reception unit and to store the generated intermediate data in the memory area;
   causing a memory management unit to allocate memory of a predetermined size in an unused area of the memory area to the first processor or the second processor from which a memory acquisition request has been given;
   if a size of memory allocated to both the first and the second processors by the memory management unit exceeds a threshold value, causing the memory management unit to allocate memory from an unused area of the memory area to one of the first and the second processors, so that a size of the memory allocated to the one of the first and the second processors corresponds to a fallback threshold value, and memory of the remaining unused area is allocated to the other of the first and the second processors, and wherein one of the first and the second processors is a processor whose fallback timing is earlier than the other of the first and the second processors, wherein in determining the processor whose fallback timing is earlier, the memory management unit calculates the fallback timing according to the following mathematical expression:

(timing of fallback performed by processor)=(resource amount necessary until $n$-th processor performs fallback)/[(time required for $n$-th processor to generate intermediate data)/(resource amount of memory used by $n$-th processor in generating intermediate data)], where n=1 or 2, and determines the processor whose fallback timing is earlier based on a result of the calculation.

* * * * *